United States Patent

Lavarenne

[15] 3,648,267

[45] Mar. 7, 1972

[54] METHOD OF DETECTION OF THE SPEED OF A MOVING BODY IN EXCESS OF A REFERENCE SPEED, AND THE CORRESPONDING APPARATUS

[72] Inventor: Jean Lavarenne, Villecresnes, France

[73] Assignee: Nord-Aviation Societe Nationale de Constructions Aeronautiques, Paris, France

[22] Filed: June 12, 1969

[21] Appl. No.: 832,787

[30] Foreign Application Priority Data

June 14, 1968 France.....................................155124

[52] U.S. Cl.............................................340/263, 324/69
[51] Int. Cl.......................................................G08b 21/00
[58] Field of Search.....................340/263, 268; 324/161, 69

[56] References Cited

UNITED STATES PATENTS 2,623,163   12/1952   Bone et al..........................340/263 X
3,037,111   5/1962   Bechstein..............................324/69 X
3,251,312   5/1966   Livingston..........................340/263 X
3,448,433   6/1969   McCune..............................340/263 X Primary Examiner—Rodney D. Bennett, Jr.
Assistant Examiner—J. M. Potenza
Attorney—Karl W. Flocks

[57] ABSTRACT

The present invention relates to a method of detection of the speed of a moving body in excess of a predetermined reference speed, the said moving body being displaced with respect to a fixed reference. It also concerns an apparatus for carrying into effect the above method, especially applicable to the control of the speed of members of automatic flight apparatus for aircraft.

The stopping of the said moving body is effected by the change in state of a circuit capable of assuming the two states, interrupted or established, and that the said change in state is caused by simultaneously bringing to the closed condition, three detectors of the interrupted or established state of a single circuit, when the speed of the moving body exceeds the limiting speed.

7 Claims, 8 Drawing Figures

Patented March 7, 1972

INVENTOR
JEAN LAVARENNE

BY KARL W FLOCKS

ATTORNEY

METHOD OF DETECTION OF THE SPEED OF A MOVING BODY IN EXCESS OF A REFERENCE SPEED, AND THE CORRESPONDING APPARATUS

The present invention relates to a method of detecting if the speed of a moving body in excess of a predetermined reference speed, the said moving body is being displaced with respect to a fixed reference point. It also concerns an apparatus for carrying into effect the above method, especially applicable to detecting and inhibiting excess of the speed of members of automatic flight control apparatus for aircraft.

The detection of the overstepping by a moving body of a predetermined reference speed, the said moving body being displaced with respect to a fixed reference point, can be obtained as is well known, by measuring the time interval which separates a signal associated with the displacement of the moving body from another signal supplied by a time counter coupled to the said fixed reference point. However, in view of the difficulties presented by accurate measurements of time, the physical interpretation of such a detection is most frequently either inaccurate, especially when the body is moving at the limiting speed or in its immediate vicinity, or alternatively, it is complicated, and in fact in this connection there does not exist any satisfactory means which are at the same time simple and practical, especially for the detection of speeds of moving bodies which follow any particular law of displacement.

The present invention provides a remedy for these inadequacies by supplying a method for detecting the occurrence of excessive speed of a moving body with respect to a given reference speed, it being possible to effect this detection over measurement ranges as numerous as necessary distributed over the whole path of the moving body, and along which the values of limit speed may be of any kind, and also by supplying a simple device for carrying the said method into effect.

The method according to the invention for the detection of the occurrence of excess speed of a moving body in excess of a predetermined limiting speed is essentially characterized by the fact that the stopping of the said moving body is effected by the change in state of a circuit capable of assuming the two states, interrupted or established, and that the said change in state is caused by simultaneously bringing to the closed condition, three switches which are concurring to the realization of the interrupted or established state of a single circuit, when the speed of the moving body exceeds the limiting speed.

According to other characteristic features, the changes of state of each of the three switches are effected by means of two references coupled to the supervised moving body, the second of which is displaced to the rear with respect to the first by a fixed distance, and by means of a time delay device on the establishment of the above circuit, the first reference leading to the closed condition of the first switch between an initial instant and a corresponding final instant at the end of the travel by the moving body over a predetermined length, the energization of the time delay device causing, at the same initial instant, the actuation to opening, at the expiry of a predetermined instant, of a second switch which is in the closed state, the second reference causing, on the one hand the closure of the third switch at an instant preceding the instant of reopening of the first switch by the first reference, and on the other hand, at the same instant, the extension of the time delay on the opening of the second switch, that is to say the maintenance of the second switch in the closed state if, and only if, this second switch has not already been activated to opening in between times, and finally after its delayed opening the reopening of the third switch when the moving body has travelled over a distance equal to the predetermined distance travelled by the first reference between the initial instant and the final instant of closure of the first switch.

In accordance with a further characteristic feature, the duration of the time delay on the opening of the second switch is regulated in such manner that when the moving body is displaced at the limiting speed, the second reference causes the closure of the third switch at the expiry of the period of time delay on the opening of the record switch.

The return to the closed and nonactuated state of the second detector is automatically effected by switching off of its electrical feeding, at the same time as the reopening of the third switch, and the switches and the references are so arranged that after a supervision cycle, a fresh cycle can immediately be initiated in the case of a supervised moving body which moves in the direction opposed to the precedent one.

The device for carrying into effect the above method is essentially characterized by the fact that it comprises, in combination:

A first electric circuit arranged between the positive terminal of a source of direct current and its negative terminal, on which are placed successively a first and a second two-pole switch which are both identical, a contactor and the control relay of a control circuit for controlling the movement of a moving member, one terminal of the above relay being directly connected to the negative terminal;

A second electric circuit, also arranged between the positive terminal and the negative terminal of the above source of direct current and comprising a time lag control relay for the contactor mounted in the first circuit, one terminal of the said time lag relay being directly coupled to the negative terminal of the current supply source, the other terminal of this same relay being connected to the positive terminal through the intermediary of two circuits connected in parallel, the opening of the first being controlled by the first two-pole switch mounted in the first electric circuit, and the opening of the second being controlled by the second two-pole switch mounted in this same first circuit;

A moving member comprising at least one cam, the active portion of which controls the closure of the first two-pole switch, and at least one cam, the active portion of which controls the closure of the second two-pole switch, identical with the first.

According to other characteristic features:

The active portion of each cam has a length of predetermined value;

The distance separating two corresponding cams is measured by a length which has the same value as that of the distance separating the two two-pole switches, reduced by a fraction of the length of the active portion of the two said cams, this fraction being predetermined;

The time delay period of the time lag relay is adjustable.

Other characteristic features and advantages of the invention will be more clearly brought out in the description which follows, given with reference to the accompanying drawings, in which.

Figure 1:
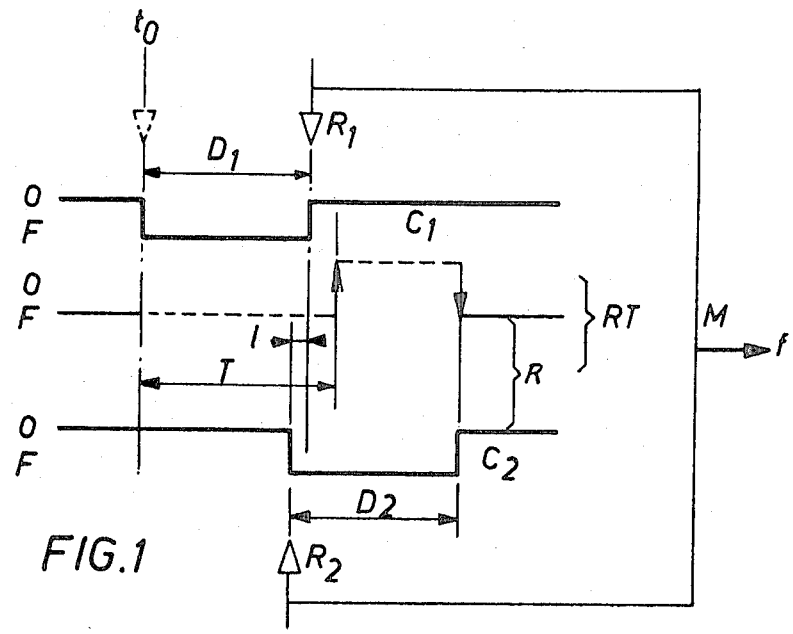
FIG. 1 shows an explanatory diagram of the method according to the invention.

In an assembly comprising a member M provided with two reference marks $R_1$ and $R_2$ which are rigidly coupled to it, coupled to the moving body the speed of which is to be controlled and moving in translation in the direction of the arrow $f$ with respect to a fixed circuit R comprising two operable and closable members $C_1$ and $C_2$ for the control and execution of the interrupted or established state of the said circuit, together with a control member RT for delaying on the interruption of this same circuit, there are produced, by means of the reference marks $R_1$ and $R_2$, the concommitant changes of condition of the members $C_1$, $C_2$ and RT, illustrated graphically in FIG. 1, in the manner indicated below, and such that, if the three above members simultaneously produce closed conditions, the fixed circuit is completely established, this state producing, by means of an appropriate device, the change of condition of a second circuit P, which controls the movement of the moving body. The member M being driven in translation as stated above; there is caused at the instant $t_0$, taken as the initial instant, simultaneously the closure of the member $C_1$ effected by the reference mark $R_1$ and the activation to opening in preparation for interrupting the circuit R at the end of the delay time T of the member RT, also effected by the reference mark $R_1$.

When this latter has moved over a predetermined length $D_1$, the opening of the member $C_1$ is effected. Between times, at the instant when the reference mark R, has travelled over the distance $D_1-l$, $l$ being a predetermined length, and when, consequently, it only remains to travel over the distance $l$, there is effected the closure of the member $C_2$, by means of the reference mark $R_2$, and at the same instant, if the time delay member RT has not yet caused the interruption of the circuit R, the establishment of a second supply circuit for the activation of the said member RT. When the reference mark $R_2$ has travelled over a distance $D_2=D_1$, starting from the instant at which it has caused the closure of $C_2$, the reopening of the member $C_2$ is caused by means of the said reference mark, and at the same time, the return to the nonactivated state of the member RT, whether this latter has previously caused the interruption or maintained the establishment of the circuit R. This latter circuit R, together with the members $C_1$, $C_2$ and RT are then in the condition in which they were immediately before the initial instant $t_0$, the assembly then being ready to repeat the same operations indicated above. The distances $D_1$ and $l$ and the duration T of the time delay are chosen in such manner that, when the moving body (that is to say the reference marks R1 and R2) is moving at the limiting speed above which any excess is to be detected, the said reference marks are displaced through the distance $D_1-l$ during the time T.

The method defined about thus permits the detection at any instant of any exceeding of a predetermined limiting speed by a moving body. In fact, if the moving body carries out the travel $D_1-l$ in a time less than the duration T of the time delay of the relay RT, that is to say if the moving body has a speed greater than the limiting speed which it should not exceed, the sequence of the successive conditions of the various members is as follows:

Before the instant $t_0$, the member C, is open, as is also the member $C_2$, while the time lag device is not activated, the circuit being not established;

At the instant $t_0$, the member $C_1$ passes to the closed state by means of the reference mark $R_1$, while the time delay device is activated for opening circuit R after T and through the intermediary of the reference mark $R_1$, the member $C_2$ remains open;

When the moving body has effected the travel $D_1$, the reference mark $R_1$ causes the reopening of the member $C_1$, while slightly before the end of this travel, at the instant when the reference mark $R_2$ has carried out the travel $D_1-l$, the said reference mark causes the closure of the member $C_2$ and the re-activation of the device RT, until the reference mark $R_2$ brings it back, after having travelled over the distance $D_2=D_1$, to the nonactuated state;

Immediately after the moving body has effected the travel $D_1-l$, the three members $C_1$, $C_2$ and RT are all simultaneously in the circuit-closing condition, thus causing the change of condition of the circuit P, and in consequence giving an indication of the exceeding of the limiting speed.

Conversely, when the speed of the moving body is less than the limiting speed, that is to say when the time $t$ taken by this latter to move over the travel $D_1-l$, is greater than the time T, the circuit R remains interrupted, since the device RT causes its interruption at the end of the time T, whereas the member $C_1$ is closed and the member $C_2$ has not yet been closed by the reference mark $R_2$.

In each of the two cases, when the reference $R_2$ has moved over the travel $D_2=D_1$, from the instant at which it has caused the closing of the member $C_2$, that is to say when it has simultaneously produced the opening of this member $C$, and the nonactivated circuit-closed condition of the device RT, all the members are then in the same condition as that which preceded the instant $t_0$, ready for a fresh detection of the condition of speed of the moving body.

The spacing $l$ introduced between the two reference marks $R_1$ and $R_2$ has therefore the essential object of defining and detecting without ambiguity the limiting case in which the travel $D_1-l$ is effected in the time T, that is to say in which the moving body is displaced at the limiting speed.

Figure 2:
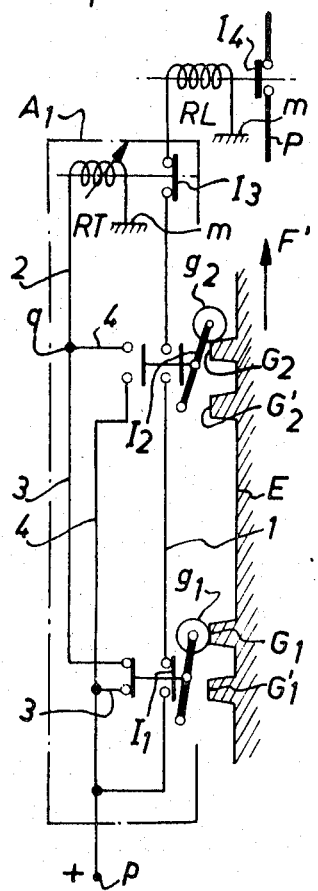
FIGS. 2 and 3 show diagrammatically a device for carrying the method into effect by means of electric circuits, in two opposite directions of operation.
Figure 3:
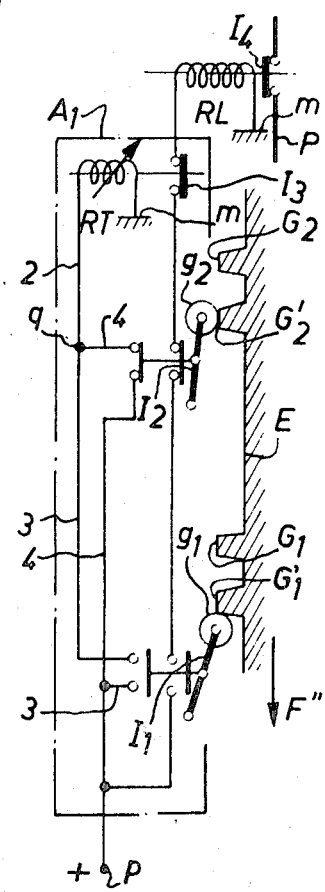

FIGS. 2 and 3 show by way of example and without any limitation, a device for carrying into effect the above method. This device is essentially constituted by a circuit 1 placed between the positive terminal $p$ of a source of direct current and an earth $m$ connected to the negative terminal of the said circuit, and comprising in succession, from the terminal $p$, a two-pole switch $I_1$ which controls circuit P, a two-pole switch $I_2$, a contactor $I_3$ and a control relay RL, the negative terminal of this latter being connected to the earth $m$.

A circuit 2, connected in parallel with that above, is provided between the positive terminal $p$ at one extremity, the other extremity being connected to the earth $m$, this circuit comprising in succession from the terminal p, a branch composed of two subcircuits 3 and 4 connected in parallel between the points $p$ and $q$, and a time lag relay RT, which is a timing relay the recycling of which is automatically obtained at the end of the delay time, the positive terminal of which is connected to the point q and the negative terminal connected to the earth $m$. The two-pole switch $I_1$, for example of the roller-type, controls the simultaneous interruption or establishment of the circuit 1 and the subcircuit 3, while the two-pole switch $I_2$, identical with that referred to above, controls the interruption or the establishment simultaneously of the circuit 1 and of the subcircuit 4, while the relay RT actuates the contactor $I_3$.

A member E provided with cams or crenellations such as $G_1$, $G_1'$ and $G_2$, $G'_2$, associated with the movement of the moving body of which the speed is to be supervised, can move in either directions so that the cams $G_1$, $G'_1$, can actuate the switch $I_1$, and the cams $G_2$, $G'_2$ can actuate the switch $I_2$ by acting on the rollers $g_2$ and $G_2$ of the said switches.

The distance between two corresponding cams such as $G_1$ and $G_2$ or $G'$, and $G'_2$ is chosen so that, when the member E moves in the direction of the arrow F' (FIG. 2), the cam $G_2$ causes the closure of the switch $I_2$ before the cam $G_1$ has caused the reopening of the switch $I_1$ (the same thing is true for $G'_2$ and $G'_1$) and, when the said member E moves in the direction of the arrow F'' (FIG. 3), the cam $G'_1$ causes the closure of switch $I_1$ before the cam $G'_2$ has caused the reopening of the switch $I_2$ (this is also true for $G_1$ and $G_2$).

The relay RL actuates a contactor $I_4$ mounted in a circuit P when the current is passing in the circuit 1, that is to say when it is simultaneously established by the switches $I_1$, $I_2$ and the contactor $I_3$; the moving body coupled to the member E is controlled by the circuit P, and, according to the established or broken condition of this latter, the movement of the moving body may or may not be continued.

The usual time-lag relay RT, is such that 1, its energization resulting from the first closure of one of the subcircuits 3 or 4 by the corresponding switch, leads at the expiry of a predetermined time to the activation in preparation for opening of the contactor $I_3$, this activation lasting as long as the one or the other subcircuit 4 or 3 has been established by the corresponding switch before the expiration of this time T, in which case its actuation is prolonged until the voltage is removed from its terminals, that is to say until the two switches $I_1$ and $I_2$ are both open, this removal causing its return to the nonactivated state with the contactor $I_3$ closed.

Figure 4:
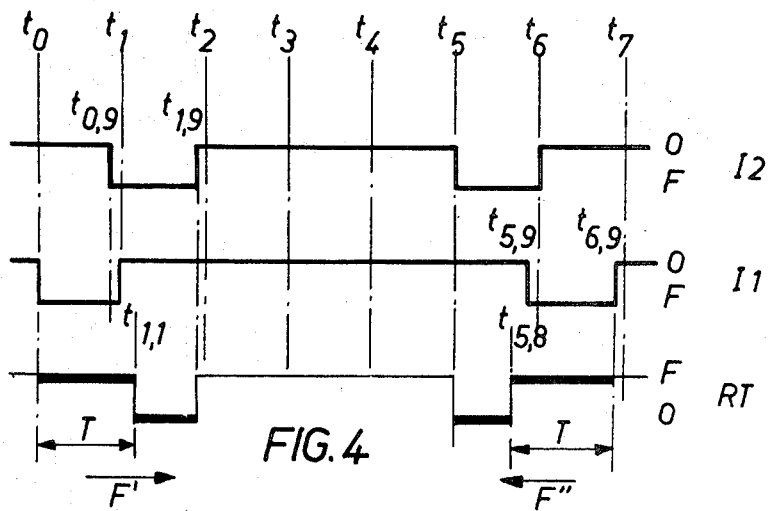
FIG. 4 is a diagram showing the distribution in time of the conditions of the circuits of the devices of FIGS. 2 and 3, during their operation.

There has been shown by way of example in FIG. 4, a curve illustrating the operation of a device such as that shown in FIGS. 2 and 3 and indicating the sequence of the different conditions assumed in time by the various elements of the device. To this end, it is assumed that the relay RT is activated to open the contactor $I_3$ a first time at the instant $t_o=0$ taken as the origin of time when the marks move in the direction F', or first time at the instant $t_{6,9}=6.9$ taken as the time origin when the marks move in the direction F'', and that the said relay RT causes the open condition of the circuit 1, respectively at the instants $t_{1,1}=1.1$ in the direction F' and $t_{5,8}=5.8$ in the direction F''.

In the first place, for the convenience of the description, it is assumed that in the direction F' (or in the direction F''), the displacement of the moving member E over a certain distance is effected in a time less than the time $T=1.1$ of time delay of the relay RT, that is to say, the speed of E is greater than the fixed limiting speed and that for this reason, the switch $I_2$ establishes the circuit 1 and the subcircuit 4, for example at the time $t_{0,9}=0.9$, while the switch $I_1$ interrupts the circuit 1 and the subcircuit 3 at the time $t_1=1$.

Under these conditions, the interrupted condition of the utilization circuit P is then obtained by the effect of the simultaneous closure of the switches $I_1$ and $I_2$ and of the contactor $I_3$ between the instant $t_{0,9}=0.9$ and $t_1=1$ when the moving body moves in the direction F', and under the effect of the simultaneous closure of the same elements between the instants $t_6=6$ and $t_{5,9}=5.9$ when the moving member E moves in the direction F''.

If it is now assumed that the moving member E moves in the direction F' (or in the direction F'') over the same predetermined length as above, in a time greater than the time $T=1.1$ of the time delay of the relay RT, that is to say at a speed less than that of the fixed limiting speed, the circuit P remains closed, because the said relay RT which had passed to the open condition at $t=1.1$ has remained in this condition as long as it was not energized; similarly, in the case where the moving member moves in the direction F'', if $I_2$ changes its condition by passing from opening to closing in a time greater than that of the duration of the time delay (which ends at the time $t_{5,8}=5.8$), the circuit P remains established since $I_1$ has not previously prolonged the actuation of the relay RT by the closed state of its control contact and because, the relay RT which had passed to the open condition at $t=5.8$ has remained in that condition, as long as it was energized.

A device such as that shown in FIGS. 2 and 3 thus permits the method described above to be carried into effect, and it is clear that the adjustments, on the one hand of the duration of the time delay T, and on the other hand of the distance between the reference points (cams or crenellations) provided on the moving member E, make it possible to define with accuracy the limiting speed or critical speed of movement of this member and to effect the automatic opening of the main circuit P when this critical speed is reached, the state of opening of the switches $I_1$ and $I_2$ furthermore returning the relay RT to its fundamental nonactuated closed condition in which it is ready to be again actuated.

Figure 6:
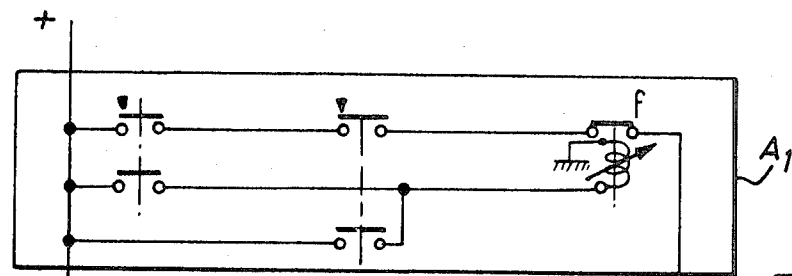
FIG. 6 shows a coupling diagram for two devices for detection of excessive speed, uniform or variable, of a moving object in two ranges of supervision, comprising electric circuits.

It is also clear that the above method of detection of the overstepping by a moving body of a predetermined limiting speed and the corresponding device, can be easily extended to detect the exceeding of a predetermined limiting speed by any one of the moving members of a single assembly which may or may not be dependent on each other. Thus, as shown diagrammatically by way of example in FIG. 6, two devices $A_1$ and $A_2$, of the same type as that shown in FIGS. 2 and 3, can be connected in parallel to a common circuit P, each of them being provided for the supervision of the speed of a member in movement and putting the common circuit P into the open condition when the uniform or nonuniform speed of the corresponding member exceeds the limiting speed which has been fixed for it.

Figure 7:
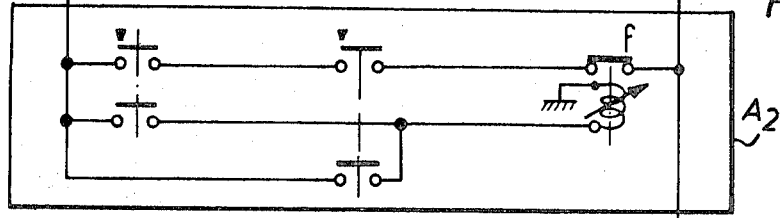
FIG. 7 shows a diagram of the association of a number of detection devices which generalize the diagram of FIG. 6.

Similarly, as shown diagrammatically by way of example in FIG. 7, $n$ devices $A_1$, $A_2$ ... $A_n$ of the same type as that shown in FIGS. 2 and 3, forming the general case of the foregoing with $n$ devices, are connected in parallel with the circuit P, each being devoted to the supervision of the speed of a member in movement belonging to an assembly of $n$ members, and exceeding of a predetermined speed by any one of these of the limiting speed which has been fixed for it resulting in the interruption of the common circuit P.

It is also clear, as regards the changes in state of the circuits, that these can be obtained by any appropriate means such as for example photoelectric cells, and not only by means of cams such as have been described above by way of example, and that the electric circuits may be replaced by hydraulic circuits comprising the corresponding control members.

One preferred form of embodiment of the device according to the invention which is described below, can be especially applied to the control of the movement of the members of an automatic flight control apparatus for an aircraft. It is in fact known that certain automatic flight control devices are supervised by circuits external to these devices, furthermore supplied by detectors independent of them, such as for example detectors of angular speeds, acceleration or trim, the supervision being then known as "external supervision."

In other automatic flight control apparatus on the other hand, the supervision is effected by means of circuits inside the said apparatus, which are then known as "internal supervision" or "autosupervision" devices. However this "autosupervision" does not in principle cover the whole of the field of flight and may moreover prove unsatisfactory for certain particular phases of flight, such as for example automatic landing approach, so that it may be necessary to duplicate this by an independent means, for reasons of safety.

The speed supervision device according to the invention makes it possible to carry out an external supervision which can be combined with, added to or replaced wholly or partly by an internal supervision, due to the fact that the speed of movement of the control to be supervised such as for example the depth rudder, the aileron control or the steering rudder is "seen" inside one or more ranges of turning as "normal" or "abnormal," that is to say less than a certain value or greater than that value.

Figure 5:
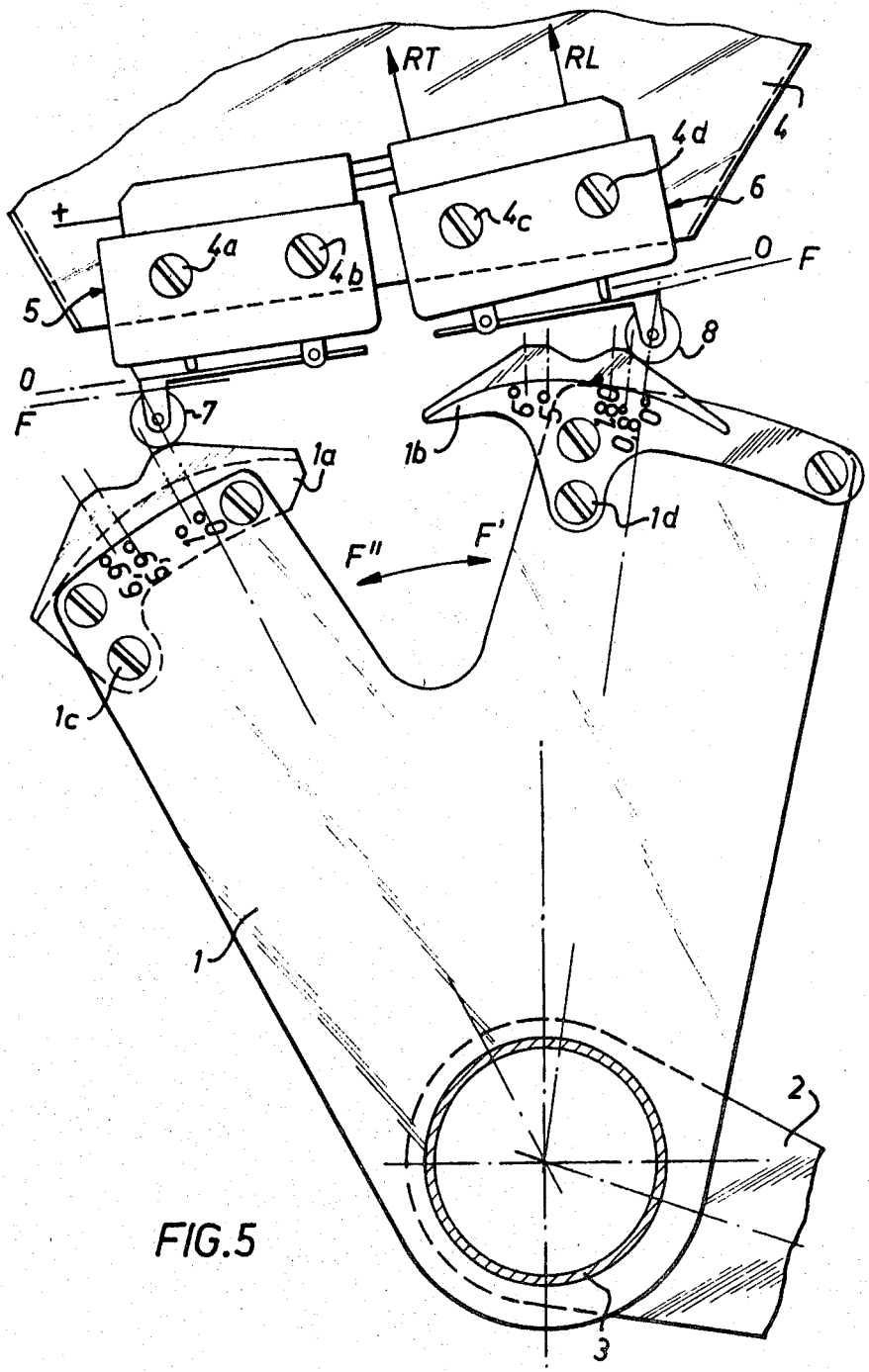
FIG. 5 shows a preferred form of embodiment of the invention, in which the supervisory device for the automatic flight control apparatus for instance is mounted on the control rod system of an aircraft.

To this end, and as shown in FIG. 5, the supervision device according to the invention, in its preferred form of embodiment, comprises a cam support 1 rigidly fixed to a control rod system 2 through the intermediary of a fixed shaft 3 movable about its axis. On the support 1 are fixed the cams $1a$ and $1b$, adjustable in position respectively by means of the screws $1c$ and $1d$, these cams being driven in rotation about the axis of the shaft 3 when the rod system 2 is in turn given the same movement, either in the direction F' or in the direction F''.

On a support 4, fixed with respect to the aircraft, is mounted an electric circuit R (not shown) comprising two roller switches 5 and 6, fixed respectively to the said support 4 by means of the screws $4a$ and $4b$ on the one hand and $4c$ and $4d$ on the other hand, together with a time lag relay RT and a relay RL for opening and closing the utilization circuit P (not shown) which is in this case an automatic releasing circuit for the automatic flight control apparatus, and is similar in its operation to the circuit P referred to in connection with the device shown in FIGS. 2 and 3.

The electric circuit is put into the interrupted or established condition by means of the switches 5 and 6, respectively actuated by the cams $1a$ and $1b$ during the course of their movement of rotation, the cams being arranged with respect to the rollers 7 and 8 of the said switches, in the same way as the arrangement of the cams $G_1$, $G'_1$ and $G_2$, $G'_2$ with respect to the switches $I_1$ and $I_2$ in the device shown in FIGS. 2 and 3. Under these conditions, the above device operates in a manner similar to the device described previously, its operating diagram being similar to that shown in FIG. 4.

There has been shown by way of example in FIG. 5, the relative distances apart in angular values of the outstanding points of each of the cam $1a$ and $1b$, these values and the positions of the cams (the cam $1a$ holding the switch 5 in the open position of the circuit and the cam $1b$ leaving the switch 6 in the closed position) causing a displacement of 0.9° between the closure of one switch and that of the other.

Again referring to the diagram of FIG. 4, if the instants $t_0$, $t_1$ ... $t_7$ shown in abscissae are chosen in such manner that they are separated by time intervals taken as units and uniformly spaced-apart by half a second, and if the duration of the time delay T is 0.55 second (this latter being shown on the diagram by a length $t=1.1$), the angular speed of the rod system, corresponding to the limiting angular speed, is then 1° in 0.55 second.

When the angular speed of the rod system is greater than the limiting speed and when it is for example 2° per second in the direction F', the cam $1a$ establishes the electric circuit R through the intermediary of the switch 5 at the instant $t_0$, while, for this reason, the time lag relay RT is energized so as to cause its opening 0.55 second later, that is to say at the instant $t=1.1$, then it closes said circuit 0.5 second later, that is to say at the instant $t_2$. In the meantime, the cam $1b$ has actuated the switch 6 to closure 0.45 second after $t_0$, that is to say at $t=0.9$, and for a period of 0.50 second, that is to say so as to maintain this opening up to the time $t=1.9$. It is then clear that between the instant $t=0.9$ and the instant $t=1$, there is simultaneous closing of circuit R by the switches 5 and 6 and the relay RT, which has the effect of causing the release of the utilization circuit P.

The same conditions obviously apply when the movement takes place at the same speed but in the opposite direction, namely in the direction F''. Furthermore, when the time lag relay RT, which is normally energized by the closure of any one of the switches 5 or 6 controlled by the cams $1a$ and $1b$ is no longer energized in consequence of a failure of the energy supply of the circuit, the movable part of the relay remains in closed condition, which implies that, whatever the speed of the moving member may be, (exceeding or not the predetermined speed) the main circuit P is in the interrupted state, this failure thus not having any adverse effect on safety.

The device constituted as above is thus a supervision device external to the automatic flight control apparatus, ensuring the safety of the system, both by the automatic declutching of the apparatus and by the warning which it gives to it by a simultaneous light signal when there is abnormal operation of the said apparatus, shown by an abnormally high speed-control movement, or resulting from a failure of the supervision device itself.

Figure 8:
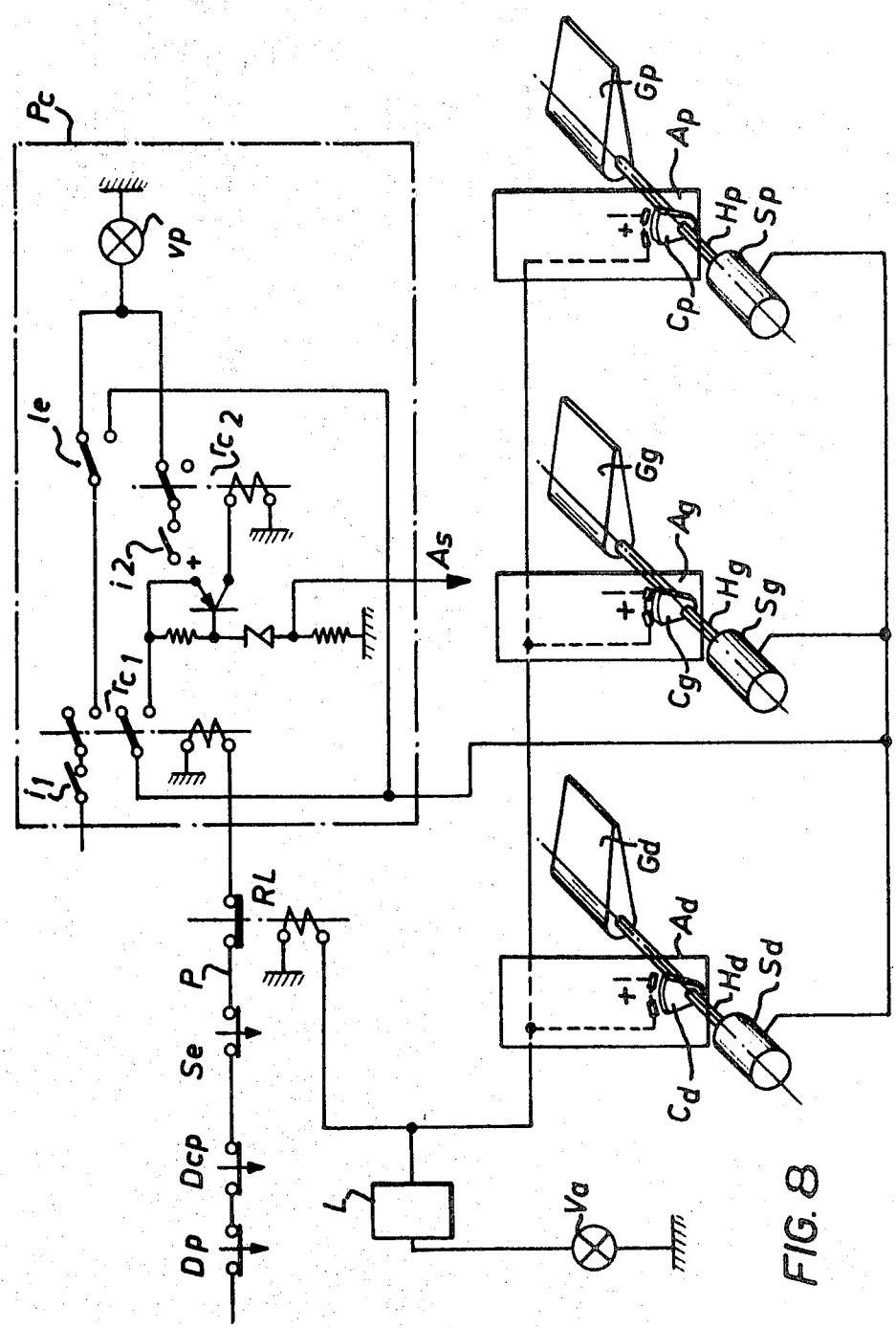
FIG. 8 represents the diagram of a simultaneous supervision apparatus for the speeds of three controls of an aircraft.

A number of devices similar to that above may be grouped together so as to form a simultaneous supervision assembly of a group of control members and to constitute the elements of an automatic flight control device of an aircraft, starting from an automatic pilot controlling, for example, the steering, banking and depth rudders. As shown in FIG. 8, an apparatus of this kind comprises for example three supervision devices $Ad$, $Ag$ and $Ap$ such as described above, and respectively cooperating with the steering rudder $Gd$, the banking control $Gg$ and the depth rudder $Gp$, each of these controls being actuated respectively by the servomotors $Sd$, $Sg$ and $Sp$ by means of shafts $Hd$, $Hg$ and $Hp$, on which are fixed the cam carriers $Cd$, $Cg$ and $Cp$, for the purpose of driving them in rotation. The circuits of the supervision devices $Ad$, $Ag$ and $Ap$, connected in parallel, terminate at the external safety relay RL controlling the interruption and the establishment of the main circuit P, which cooperates with the various elements contained in a control desk $Pc$, such that the external autosupervision control circuits $As$, the interruption and establishment of which are placed under the control of the clutching relay of the automatic pilot $rC_1$ and $rC_2$, the state of which is controlled by the opening or closure of the circuit P by the relay RL, when the automatic piloting position has been chosen, this position being determined by the position, on the one hand of the declutching pushbuttons $Dp$ and $Dcp$ at the piloting and copiloting control sticks and of the external safety pushbuttons $Se$ (inclination, acceleration, for example) in the circuit P, and on the other hand of the switches $i_1$ and $i_2$ supplying the automatic piloting and of the clutching lever $l_e$ of this latter on the control desk, an indicator $vp$ placed on a shunt circuit, indicating by its lighted or extinguished condition the state of closure or opening of the switches $i_1$ and $i_2$ and of the lever $l_e$. Similarly, the circuit of the relay RL is completed by a shunt circuit comprising an alarm indicator $v_a$ and a casing L for the a logic circuit.

In this apparatus, the servomotors of the aircraft controls are normally supplied when the switches $i_1$ and $i_2$ are closed, when the lever $l_e$ is in the closed position and when the circuit P is also closed. In this case, as soon as the relay $rC_1$ closes, the servomotors are actually under tension due to the fact of the closure of $l_e$, and the indicator $vp$ lights up, while the supply of these same servomotors is cut off when the switch controlled by the relay RL closes, thus causing the opening of the circuit P. The relay RL (shown closed in FIG. 8 since the control servomotors are not under tension) is therefore truly an additional supervision device interposed in order to cause the closure of the circuit P when the turning speed of one of the controls exceed a predetermined limiting speed.

It will of course be understood that the present invention has only been described and illustrated purely by way of explanation and not in any limitative sense, and that any useful modification can be made thereto without thereby departing from its scope.

I claim:

1. A method of detecting of the exceeding of a predetermined limiting speed by a moving body, said body moving with respect to a fixed reference position, in which:

the stopping of said moving body is effected by the change of state of a first circuit capable of assuming the two states, "interrupted" or "established" only, and the said change of state is effected by bringing three switches of the interrupted or established state of a single circuit simultaneously to the closed condition when the speed of the moving body exceeds said limiting speed;

the changes of state of each of the three switches are effected by means of two reference points coupled to the moving body, the second of which is located to the rear with respect to the first one by a fixed distance, and by means of a time-delay device on the establishment of said circuit, said first reference point resulting in the closed condition of the first switch between an initial instant and a final instant corresponding to the end of the travel by the moving body over a predetermined length, this same reference point causing, at the same initial instant, the energization in preparation for opening, after a predetermined time delay, of a second switch which is in the closed state, said second reference point causing, on the one hand the closure of the third switch at an instant preceding the instant of reopening of the first switch by the first reference point, and on the other hand, at the same instant, the extension of the time delay on the opening of the second switch, that is to say the maintenance of the second switch in the closed state if, and only if, this second switch has not meanwhile been activated to opening, and finally after its delay opening the reopening of the third switch when the moving body has travelled over a distance equal to the predetermined distance travelled by the first reference point between the initial instant and the final instant of closure of said first switch.

2. A method as claimed in claim 1, in which:

the duration of the time delay on the opening of the second switch is regulated in such manner that when the moving body is displaced at the limiting speed, said second reference point causes the closure of the third switch at the expiry of the duration of the time delay on the opening of said second switch;

the return to the nonactivated state of said second switch is effected and to closed state, if said second switch is in the open condition, at the same time as the reopening of the third switch, and said switches and said reference points are so arranged that, after a supervision cycle, a fresh supervision cycle can immediately be initiated.

3. A device for the detecting of the exceeding of a predetermined limiting speed by a moving body, said device comprising:

a first electric circuit arranged between the positive terminal of a source of direct current and its negative terminal, in which are provided successively a first and a second two-pole switch identical with each other, a contactor and a control relay of a control circuit for controlling the speed of a moving member, one terminal of the above relay being directly connected to the negative terminal;

a second electric circuit, also arranged between the positive terminal and the negative terminal of said source of direct current and comprising a time lag control relay for the contactor mounted in the first circuit, one terminal of said time lag relay being directly connected to the negative terminal of said current-supply source, the other terminal of said relay being connected to the positive terminal through the intermediary of two branch circuits connected in parallel, the interruption of the first being controlled by the first two-pole switch mounted in the first electric circuit, and the interruption of the second branch circuit being controlled by the second two-pole switch mounted in this same first circuit;

a moving member rigidly fixed to said body and comprising at least one cam, the active portion of which cooperates with said first two-pole switch, and at least one cam identical with the first, the active portion of said second cam cooperating with said second two-pole switch.

4. A device as claimed in claim 3, in which the duration of the time delay of said time lag relay is adjustable.

5. A device as claimed in claim 3, in which the active portion of each said cam has a predetermined value of length.

6. A device as claimed in claim 3, in which the space separating two corresponding cams has a length which is the same as the distance separating the two two-pole switches, reduced by a fraction of the length of the active portion of the two said cams, this fraction being predetermined.

7. A device as claimed in claim 3, in which the moving member rigidly fixed to said body comprises two groups of identical cams, the cams of the first group cooperating in turn with the first two-pole switch, the cams of the second group cooperating in turn with the second two-pole switch, two cams which correspond in each of the two said groups being separated by a distance of the same length.

* * * * *